United States Patent

Lin

(10) Patent No.: US 8,777,495 B2
(45) Date of Patent: Jul. 15, 2014

(54) OPTICAL CONNECTOR WITH SLOPED SURFACE

(71) Applicant: Hon Hai Precision Industry Co., Ltd., New Taipei (TW)

(72) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/727,601

(22) Filed: Dec. 27, 2012

(65) Prior Publication Data

US 2014/0112622 A1   Apr. 24, 2014

(30) Foreign Application Priority Data

Oct. 24, 2012   (TW) .............................. 101139319 A

(51) Int. Cl.
 *G02B 6/12* (2006.01)
 *G02B 6/36* (2006.01)
 *G02B 6/42* (2006.01)

(52) U.S. Cl.
USPC .................. 385/79; 385/88; 385/147; 257/90

(58) Field of Classification Search
USPC ........ 385/78–79, 88–92, 147; 257/81–81, 90, 257/99; 250/227, 227.24, 239
See application file for complete search history.

(56) References Cited

U.S. PATENT DOCUMENTS

| 4,945,400 | A  | * | 7/1990  | Blonder et al. | 257/116 |
|-----------|----|---|---------|---------------|---------|
| 5,434,939 | A  | * | 7/1995  | Matsuda | 385/88 |
| 6,504,107 | B1 | * | 1/2003  | Kragl | 174/260 |
| 6,580,614 | B2 | * | 6/2003  | Yen et al. | 361/728 |
| 6,778,732 | B1 | * | 8/2004  | Fermann | 385/31 |
| 6,832,861 | B2 | * | 12/2004 | Kragl | 385/88 |
| 6,893,168 | B2 | * | 5/2005  | Huang et al. | 385/92 |
| 7,063,467 | B2 | * | 6/2006  | Nagasaka et al. | 385/88 |
| 7,246,954 | B2 | * | 7/2007  | Vancoille et al. | 385/94 |
| 8,066,417 | B2 | * | 11/2011 | Balazs et al. | 362/555 |
| 2013/0135604 | A1 | * | 5/2013 | Gogolla et al. | 356/4.01 |
| 2013/0266260 | A1 | * | 10/2013 | Morioka et al. | 385/33 |

* cited by examiner

*Primary Examiner* — Akm Enayet Ullah
(74) *Attorney, Agent, or Firm* — Novak Druce Connolly Bove + Quigg LLP

(57) ABSTRACT

An optical connector includes a printed circuit board (PCB), an optical-electric coupling element, a jumper, and optical fibers. The optical-electric coupling element is attached on the PCB. The jumper is detachably positioned on the optical-electric coupling element. The optical-electric coupling element includes first coupling lenses. The jumper includes a first external sidewall, a second external sidewall, a third external surface, and a fourth external surface. The first external sidewall defines receiving holes. Each optical fiber is received in a respective receiving hole. The third external surface defines a sloped surface extending from the third external surface to the first external sidewall. The third external surface and the sloped surface form an angle therebetween. The fourth external surface defines a cavity. The jumper includes second coupling lenses positioned on a bottom surface of the cavity. Each second coupling lens is aligned with a respective first coupling lens.

11 Claims, 4 Drawing Sheets

OPTICAL CONNECTOR WITH SLOPED SURFACE

BACKGROUND

1. Technical Field

The present disclosure relates to optical connectors, and particularly to an optical connector which has a sloped surface.

2. Description of Related Art

Optical connectors typically include a photoelectric conversion chip, such as a laser diode or a photo diode, and an optical fiber. The photoelectric conversion chip emits or receives light carrying data to or from the optical fiber for data transmission. In certain circumstances, the light path between the photoelectric conversion chip and the optical fiber must be bent about 90 degrees to reduce a length or height of the optical connector. This may be achieved by a reflective mirror tilted at 45 degrees with respect to the photoelectric conversion chip and the optical fiber. However, the accurate positioning of the reflective mirror to align the reflective mirror with the photoelectric conversion chip and the optical fiber is essential but difficult.

Therefore, it is desirable to provide an optical connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
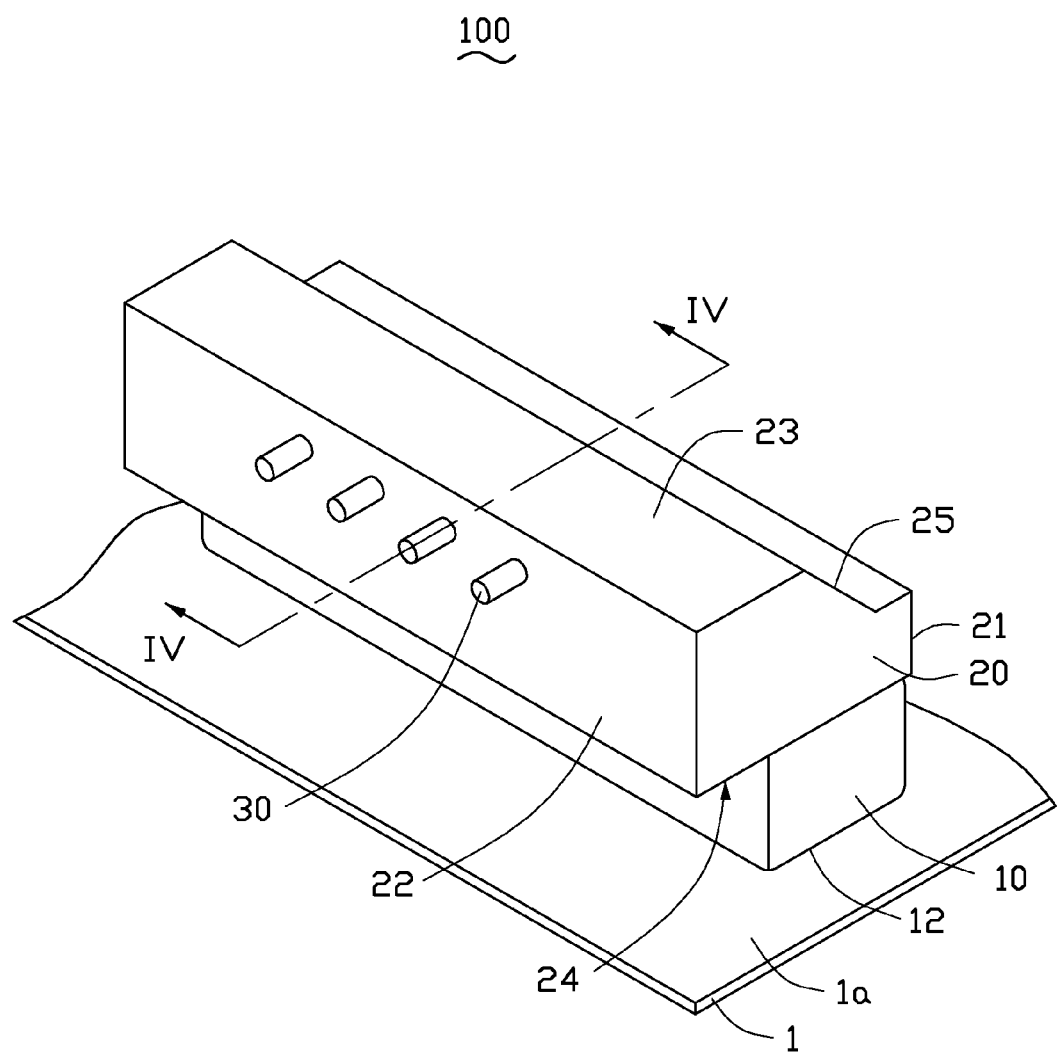
FIG. 1 is an assembled, isometric view of an optical connector which includes an optical-electric coupling element, a jumper and a number of optical fibers, according to an exemplary embodiment.
Figure 2:
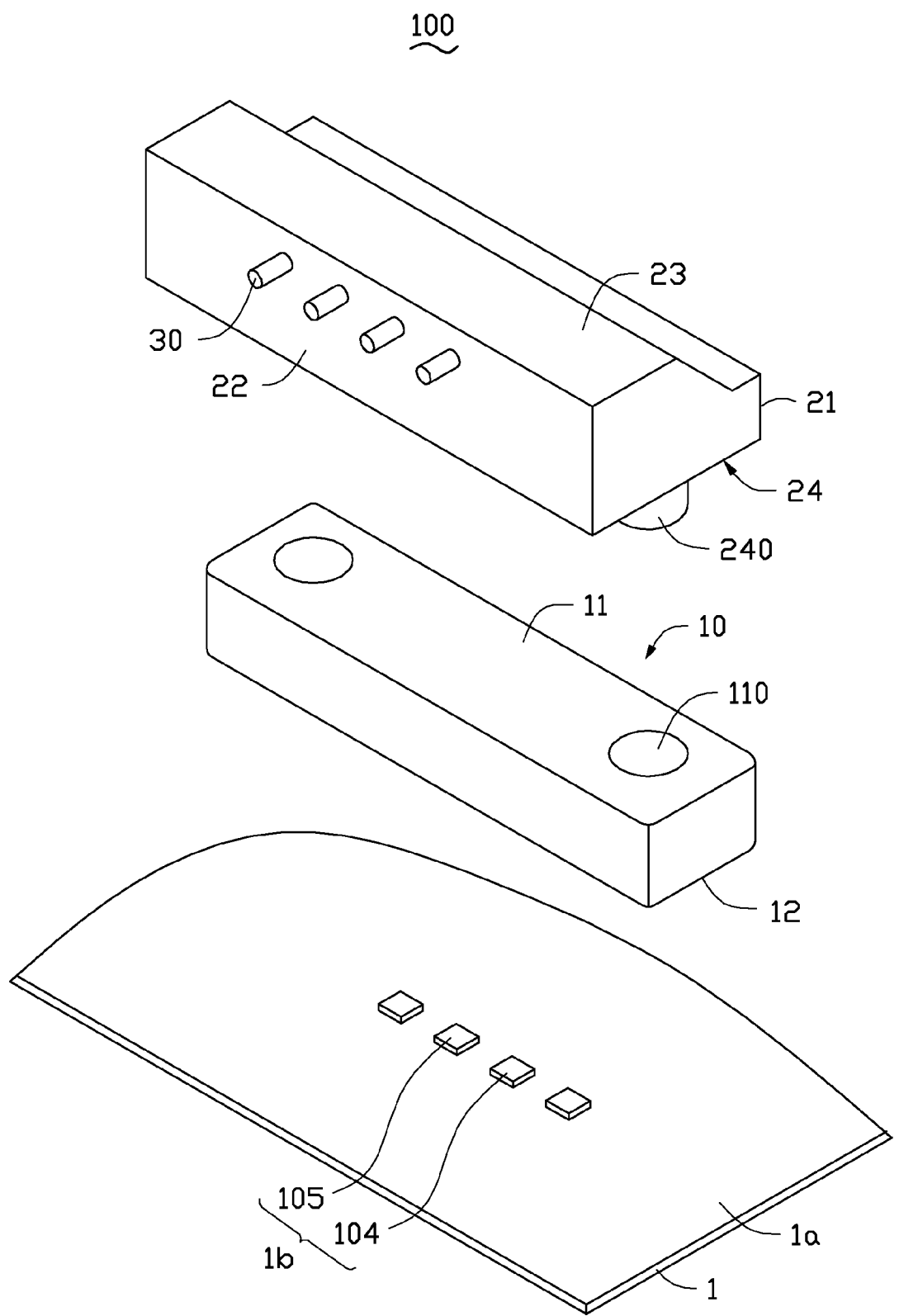
FIG. 2 is an exploded, isometric view of the optical connector of FIG. 1.
Figure 3:
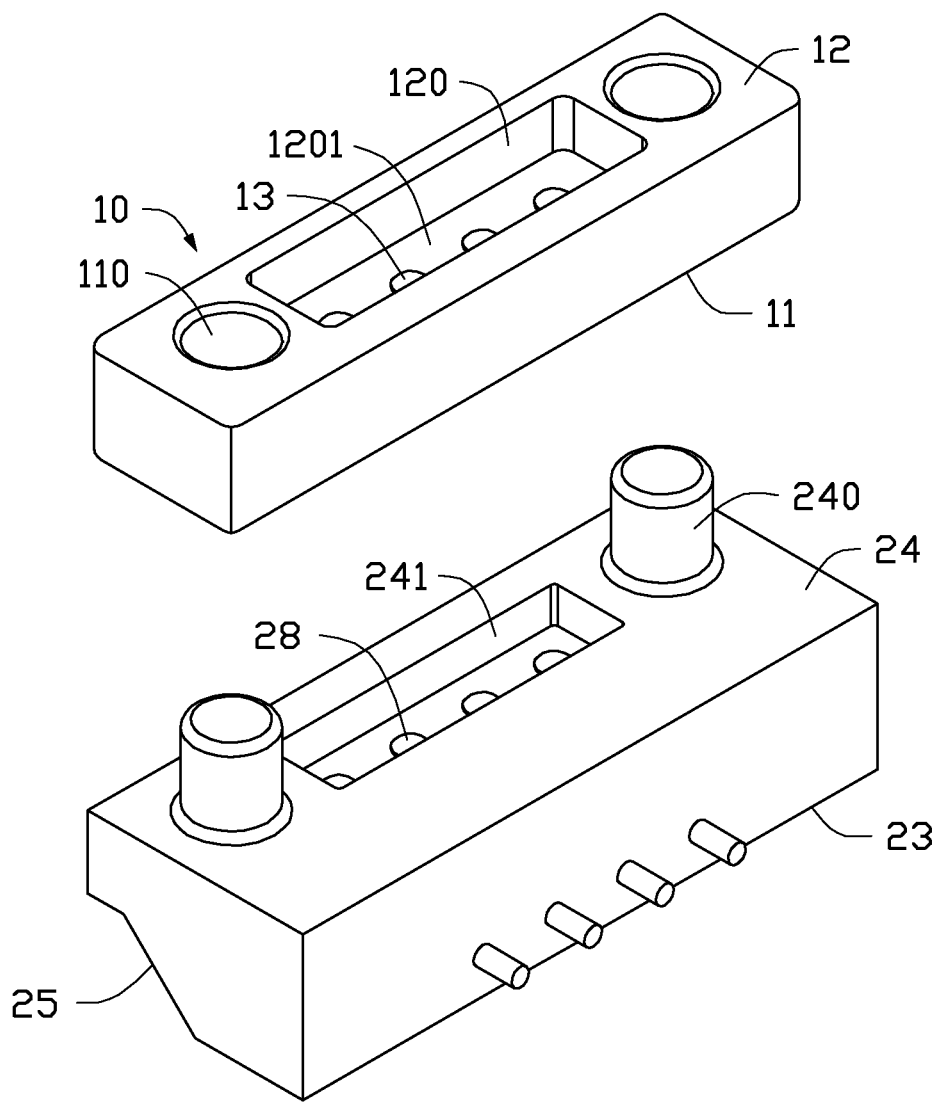
FIG. 3 is an isometric view of the optical-electric coupling element, the jumper and the optical fibers of FIG. 1, but viewed from another angle.
Figure 4:
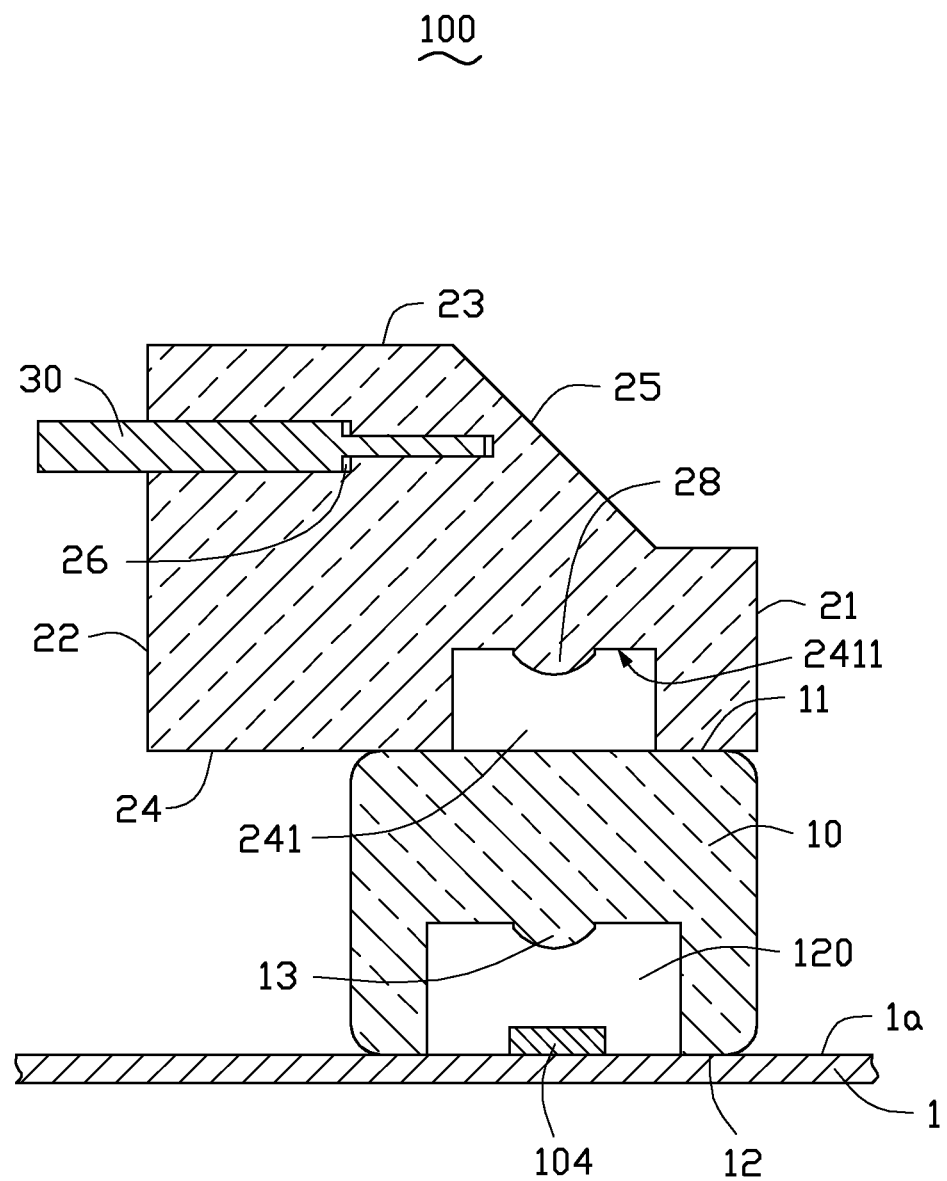
FIG. 4 is a cross-sectional view taken along line IV-IV of FIG. 1.

FIGS. 1-4 show an optical connector 100, according to an embodiment. The optical connector 100 includes a printed circuit board (PCB) 1, an optical-electric element 10, a jumper 20 and four optical fibers 30. The optical-electric element 10 is positioned on the PCB 1. The jumper 20 is detachably connected to the optical-electric element 10. The four optical fibers 30 are received in the jumper 20.

The PCB 1 includes a supporting surface 1a. A photoelectric conversion module 1b is positioned on the supporting surface 1a and electrically connected to the PCB 1. The photoelectric conversion module 1b includes four photoelectric conversion chips, such as two laser diodes 104 and two photo diodes 105. The PCB 1 contains various circuits (not shown) that connect with the photo electric conversion module 1b, and thus drive the laser diodes 104, to emit light according to input data for transmitting the input data, and for the demodulation of data in the light received by the photo diodes 105.

The optical-electric element 10 includes an upper surface 11 and a lower surface 12 facing away from the upper surface 11. The upper surface 11 is substantially parallel with the lower surface 12. The optical-electric element 10 defines a first cavity 120 in the lower surface 12 and two locating holes 110 passing through the upper surface 11 and the lower surface 12. In the embodiment, the two locating holes 110 are symmetrical about the first cavity 120. A bottom portion 1201 of the first cavity 120 forms four first coupling lenses 13. In the embodiment, all of the first coupling lenses 13 are convex lenses and integrally formed with the optical-electric element 10. The lower surface 12 is positioned on the supporting surface 1a of the PCB 1, with each of the coupling lens 13 aligning with a respective one of the laser diodes 104 and the photo diodes 105.

The jumper 20 includes a first external sidewall 21, a second external sidewall 22 facing away from the first external sidewall 21, a third external surface 23, and a fourth external surface 24 facing away from the third external surface 23. The first external sidewall 21 is substantially parallel with the second external sidewall 22.

The third external surface 23 is substantially parallel with the fourth external surface 24. Both the third external surface 23 and the fourth external surface 24 are perpendicularly connected to the first external sidewall 21 and the second external sidewall 22.

The jumper 20 also includes two locating poles 240 perpendicularly extending from the fourth external surface 24. The two locating poles 240 spatially correspond to the locating holes 110 of the optical-electric element 10. The jumper 20 is detachably positioned on the upper surface 11, with each of the locating poles 240 being engaged with a respective one of the locating holes 110.

The jumper 20 defines a second cavity 241 in the fourth external surface 24. A bottom surface 2411 of the second cavity 241 forms four second coupling lenses 28. In the embodiment, all of the second coupling lenses 28 are convex lenses and integrally formed with the jumper 20. Each of the second coupling lenses 28 aligns with a respective one of the first coupling lens 13.

The third external surface 23 defines a sloped surface 25 extending from the third external surface 23 to the first external sidewall 21. The third external surface 23 and the sloped surface 25 define an angle therebetween. In the embodiment, the angle is about 45 degrees. An angle between an optical axis of each second coupling lens 28 and the sloped surface 25 is therefore also about 45 degrees.

The second external sidewall 22 defines four receiving holes 26 for receiving the four optical fibers 30. The optical fibers 30 are positioned above and substantially parallel with the PCB 1, and correspond to the photoelectric conversion chips.

In use, light emitted from the two laser diodes 104 is directed into the optical-electric element 10 by two of the first coupling lenses 13, then directed into the jumper 20 by two of the second coupling lenses 28, the light path is bent about 90 degrees by the sloped surface 25. In the embodiment, the optical fibers 30 are positioned on the light path formed by the light emitted by the laser diodes 104 and bent by the sloped surface 25. As such, the light is finally reflected into the optical fibers 30 by the sloped surface 25. A process of the photo diodes 105 receiving light is the reverse to that of the laser diodes 104 emitting light.

In other embodiments, the first coupling lenses and the second coupling lenses 13, 28 can be omitted if the intensity of light is great enough for data transmission.

In other embodiments, the numbers of the laser diodes 104, the photo diodes 105, the first coupling lenses 13, the second coupling lenses 28 and the optical fibers 30 can be changed depending on need.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
   a printed circuit board (PCB) comprising a supporting surface, at least one laser diode, and at least one photo diode, the at least one laser diode and the at least one photo diode positioned on the supporting surface;
   an optical-electric coupling element positioned on the PCB and receiving the at least one laser diode and the at least one photo diode, the optical-electric coupling element comprising at least two first coupling lenses, each of the at least two first coupling lenses aligning with a respective one of the at least one laser diode and the at least one photo diode;
   a jumper detachably connected to the optical-electric coupling element, the jumper comprising a first external sidewall, a second external sidewall facing away from the first external sidewall, a third external surface, and a fourth external surface facing away from the third external surface, the first external sidewall defining a plurality of receiving holes, the third external surface defining a sloped surface extending from the third external surface to the first external sidewall, the third external surface and the sloped surface forming an angle therebetween, the fourth external surface defining a first cavity, the jumper comprising at least two second coupling lenses positioned on a bottom surface of the first cavity, each of the at least two second coupling lenses aligning with a respective one of the at least two first coupling lenses; and
   a plurality of optical fibers, each of the optical fibers received in a respective one of the receiving holes.

2. The optical connector of claim 1, wherein the optical-electric coupling element comprises an upper surface and a lower surface facing away from the upper surface, the optical-electric coupling element defines a second cavity in the lower surface, the first coupling lenses are positioned on a bottom portion of the second cavity.

3. The optical connector of claim 2, wherein the upper surface is substantially parallel with the lower surface.

4. The optical connector of claim 2, wherein the optical-electric coupling element defines two locating holes passing through the upper surface and the lower surface, the jumper comprises two locating poles perpendicularly extending from the fourth external surface, the two locating poles spatially correspond to the locating holes, the jumper is detachably positioned on the upper surface, with each of the locating poles being engaged with a respective one of the locating holes.

5. The optical connector of claim 4, wherein the two locating holes are symmetrical about the second cavity.

6. The optical connector of claim 2, wherein all of the first coupling lenses are convex lenses and integrally formed with the optical-electric coupling element.

7. The optical connector of claim 1, wherein all of the second coupling lenses are convex lenses and integrally formed with the jumper.

8. The optical connector of claim 1, wherein the angle between the third external surface and the sloped surface is about 45 degrees.

9. The optical connector of claim 8, wherein an angle between an optical axis of each second coupling lens and the sloped surface is also about 45 degrees.

10. The optical connector of claim 1, wherein the optical fibers are positioned above and substantially parallel with the PCB.

11. The optical connector of claim 1, wherein the first external sidewall is substantially parallel with the second external sidewall, the third extrnal surface is substantially parallel with the fourth external surface, both the third external surface and the fourth external surface are perpendicularly connected to the first external sidewall and the second external sidewall.

* * * * *